United States Patent [19]

Smith et al.

[11] Patent Number: 4,577,717

[45] Date of Patent: Mar. 25, 1986

[54] TRACK UNIT EXTENSION FOR WIDE TRACK CRAWLER VEHICLES

[75] Inventors: Joseph J. Smith; Paul K. Erickson, both of Dubuque, Iowa

[73] Assignee: Deere & Company, Moline, Ill.

[21] Appl. No.: 378,699

[22] Filed: May 17, 1982

[51] Int. Cl.⁴ .................................... B62D 55/10
[52] U.S. Cl. ............................................. 180/9.1
[58] Field of Search ............... 180/9.48, DIG. 2, 906, 180/9.1, 9.2 R

[56] References Cited

U.S. PATENT DOCUMENTS

| | | | |
|---|---|---|---|
| 2,035,858 | 3/1936 | Bauer et al. | 180/9.48 |
| 2,297,485 | 9/1942 | Lentz | 180/9.48 |
| 3,037,571 | 6/1962 | Zelle | 180/9.48 |
| 3,674,105 | 7/1972 | Egli | 180/9.48 |
| 3,820,616 | 6/1974 | Juergens | 180/9.48 |
| 3,825,088 | 7/1974 | Copeland | 180/9.5 |
| 3,894,597 | 7/1975 | Wagner | 180/9.48 |

Primary Examiner—John A. Pekar

[57] ABSTRACT

A crawler vehicle has a pair of extra-wide high flotation tracks respectively supported on a pair of fore-and-aft extending track frames on opposing sides of the vehicle, the track frame being rigidly connected to the main frame. Rearwardly located to the rear of each track frame is a spacer mounted to the side of the track frame. A diagonal brace is mounted to the spacer. A pivot shaft communicates the two track frames such that the diagonal frames are also mounted to the pivot shaft. The spacer is comprised of a first member having a top surface and opposing outwardly extending end walls leading to respective mounting surfaces. A plurality of sidewalls are fixably mounted to the first member and the main frame. The top surface of the first member has a portion which extends above and is fixably mounted to the sidewalls of the spacer.

2 Claims, 3 Drawing Figures

TRACK UNIT EXTENSION FOR WIDE TRACK CRAWLER VEHICLES

BACKGROUND OF THE INVENTION

The present invention relates to track frames for a track-laying tractor and more particularly relates to a spacer mounted to the track frame.

It is known to provide extra wide tracks as an option for crawler type tractors, the wide tracks being used when the vehicle requires more than the usual amount of flotation, such as when the vehicle is being operated in snow or other soft footing. In order to provide this option, it has been customary to provide a separate A-frame or diagonal brace construction to provide the proper spacing between the track frames to be suitable for the wide track. It would therefore be advantageous in view of the associated cost of providing separate diagonal braces, to have a means whereby the standard diagonal brace can be adapted to be suited for wide track application.

SUMMARY OF THE INVENTION

It is therefore an objective of the present invention to provide a means whereby the standard diagonal brace associated with the crawler tractor can be adapted to be suited for application with the crawler track vehicles having the wide track option.

A spacer includes a first member with a planular top surface and opposite outwardly extending end walls leading to a mounting surface. The mounting surface of the first member is fixably mounted to the respective track frame at the mounting surfaces. Sidewalls are fixably mounted to the first member and the track frame. The top surface of the first member has a portion which extends above the sidewalls and is fixably mounted to the sidewalls. The diagonal brace is fixably mounted to the top surface of the first member.

DESCRIPTION OF THE PREFERRED EMBODIMENT

Figure 1:
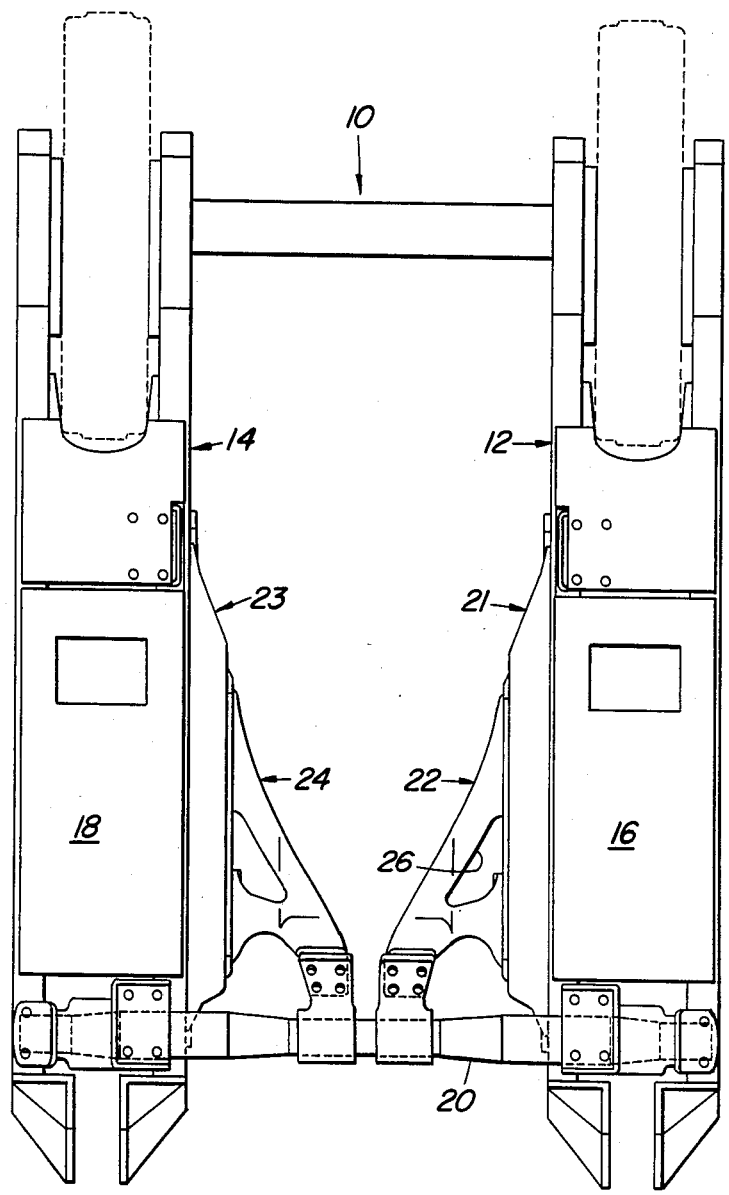
FIG. 1 is a top plane view of the opposing track frames of a track-laying tractor suitable for wide track applications.

Referring now to FIG. 1, therein is shown a track frame assembly indicated in its entirety by reference numeral 10. The track frame assembly 10 is of the general type associated with track-laying tractors and include a right and left frame 12 and 14, respectively, shown here with many details omitted for simplicity. Frames 12 and 14 serve to support endless track members (not shown) and for that purpose includes respective longitudinally extending main frame portions 16 and 18 about which the endless track members pass. The rear ends of the frame portions 16 and 18 are supported from the main body (not shown) of the vehicle through means of a horizontal transverse pivot shaft 20 which is rigidly fixed in the body and has its opposing ends journeyed in the frame portions 16 and 18. For the purpose of counteracting side loads which may be imposed on the track frame during turning operations of the vehicle with which they are associated, the frames 12 and 14, respectively, include spacers 21 and 23 having fixably mounted atop each spacer a diagonal brace 22 and 24 which respectively extend between the main frame portion 16 and 18 and the pivot shaft 20.

The right diagonal brace 22 includes a forward section 26 fixably mounted, as by welding, to the top of the spacer 21 which in turn is fixably mounted (as by welding) to the inner surface of main frame 16 at a location intermediate between the fore and rear ends thereof. The brace section 26 extends inwardly and rearwardly and terminates at the rear end portion 28 located just forward of the pivot shaft 20. The rear end portion 28 is mounted to the pivot shaft 20 in a manner described in U.S. Pat. 3,894,597 herein incorporated by reference.

Except for being designed for the left frame 14, the left spacer 23 and diagonal brace 24 are similar to the right spacer 21 and brace 22 and are fixably mounted to the inner surface of main frame 18 in like manner. No further discussion thereof is thought necessary.

Figure 3:
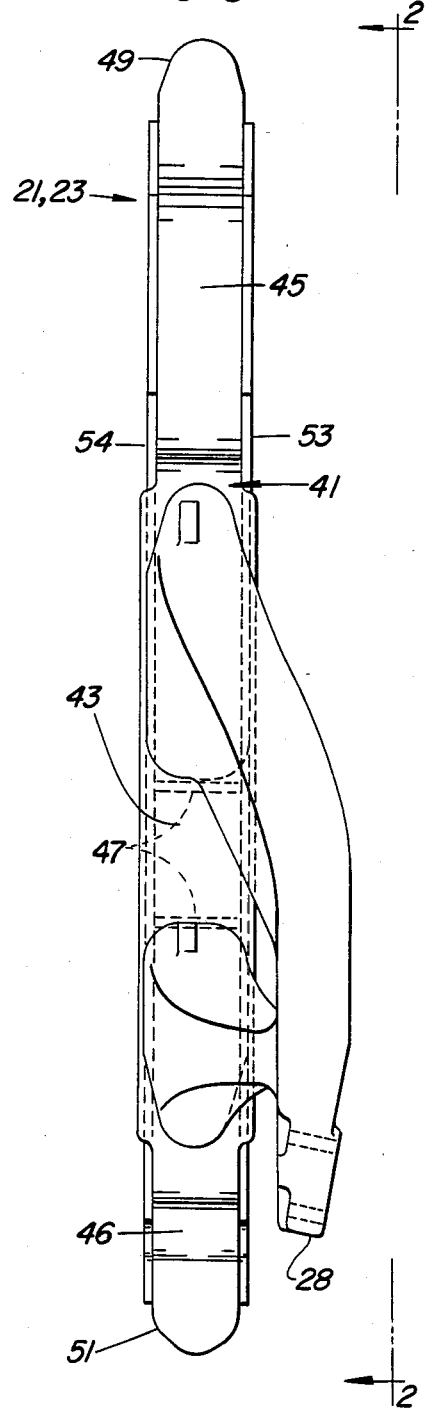
FIG. 3 is a side view of the spacer and mounted diagonal brace.
Figure 2:
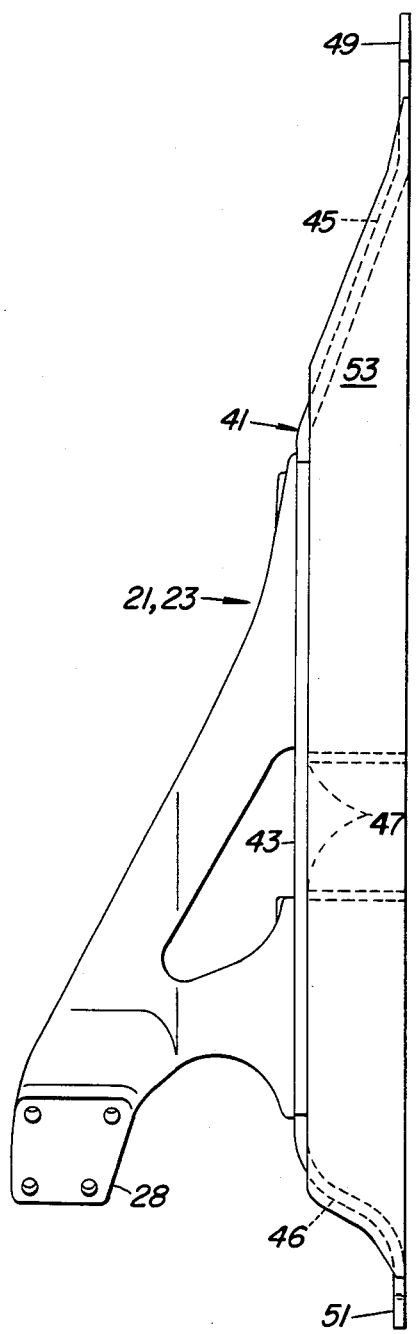
FIG. 2 is a top view of the diagonal brace mounted to a spacer in accordance with the present invention.

Referring more particularly to FIGS. 2 and 3, it is observed that each spacer 21 and 23 is constructed identically; therefore, for the purpose of simplicity only spacer 21 will be described in detail. Spacer 21 is comprised of a first member 41 having a top surface 43 with a generally planular extension leading to opposite outwardly extending end walls 45 and 46 which in turn will lead to respective planular extending mounting surfaces 49 and 51. A plurality of sidewlls 53 and 54 are fixably mounted to the respective opposite sides of the first member 41 along one face and are fixably mounted to the main frame section 16 or 16 along a bottom side surface. The top surface of the first member 41 includes a portion which extends over the sidewalls and is fixably mounted along the top side of the sidewalls. A plurality of stiffeners 47 are fixably mounted to walls 43, 53 and 54 in spaced apart relation and are orientated perpendicular to walls 43, 53 and 54.

The preferred embodiment of the present invention as aforedescribed is comprised of overlaying plates allowing self-fixing and accommodating large forming tolerances while maintaining snug fit of all parts. The simple parts are flared together with little or no machining thus making the part easier and cheaper to form relative to forming an optional brace construction.

We claim:

1. In a track frame assembly of the type including transversely spaced track frames, each of said track frames including fore-and-aft extending main frame portions, a transverse horizontal pivot shaft means extending between and connected to the main frame portions at a rearward location thereof, a plurality of inwardly and rearwardly extending generally diagonal braces, and means for securing a respective diagonal brace to a respective one of said main frames such that the rearward section of said braces are pivotally connected to said pivot shaft means, wherein the improvement comprises, said means for securing said respective diagonal brace to a respective one of said main frames including a spacer having a first member having a generally flat top surface and opposite outwardly extending end walls angled outward with respect to said top surface leading to respective outwardly extending mounting walls fixably mounted to a respective main frame, a plurality of second members each extending generally horizontally fixably mounted along a portion of its inward surface to a respective side of each one of said end walls of said first member, said top surface having a portion overhanging a portion of one side of each of said second member and fixably mounted thereto; said diagonal brace fixably mounted to said top surface of a respective one of said first member, said spacer being fixably mounted to a respective one of said main frame portions.

2. A track frame assembly as claimed in claim 1 further comprising a plurality of stiffeners fixably mounted to and extending between said second members.

* * * * *